(12) United States Patent
Chuang et al.

(10) Patent No.: US 7,757,550 B2
(45) Date of Patent: Jul. 20, 2010

(54) VALVE STEM WITH AN ADJUSTABLE TIRE PRESSURE DETECTOR

(75) Inventors: Kuo-Chih Chuang, Fongyuan (TW); Hung-Chih Yu, Taichung (TW)

(73) Assignee: Orange Electronics Co., Ltd., Tanzih Hsiang (TW)

( * ) Notice: Subject to any disclaimer, the term of this patent is extended or adjusted under 35 U.S.C. 154(b) by 106 days.

(21) Appl. No.: 12/212,304

(22) Filed: Sep. 17, 2008

(65) Prior Publication Data
US 2010/0064791 A1 Mar. 18, 2010

(51) Int. Cl.
*B60C 23/02* (2006.01)
(52) U.S. Cl. ..................................... 73/146.8
(58) Field of Classification Search ............... 73/146.8
See application file for complete search history.

(56) References Cited

U.S. PATENT DOCUMENTS

| | | | | |
|---|---|---|---|---|
| 6,805,000 | B1 * | 10/2004 | Sheikh-Bahaie | 73/146.8 |
| 6,862,929 | B2 * | 3/2005 | Luce | 73/146.8 |
| 7,395,702 | B2 * | 7/2008 | Qiu et al. | 73/146.8 |
| 2002/0124925 | A1 * | 9/2002 | Caretta et al. | 152/415 |
| 2004/0031316 | A1 * | 2/2004 | Lundqvist | 73/146 |
| 2004/0112129 | A1 * | 6/2004 | Lundqvist et al. | 73/146 |
| 2004/0263324 | A1 * | 12/2004 | Sanchez et al. | 340/442 |
| 2006/0272402 | A1 * | 12/2006 | Yin et al. | 73/146.8 |
| 2007/0113637 | A1 * | 5/2007 | Blossfeld | 73/146.8 |

FOREIGN PATENT DOCUMENTS

| | | | |
|---|---|---|---|
| JP | 09159567 A | * | 6/1997 |
| JP | 2008039441 A | * | 2/2008 |

* cited by examiner

*Primary Examiner*—Andre J Allen
(74) *Attorney, Agent, or Firm*—C. G. Mersereau; Nikolai & Mersereau, P.A.

(57) ABSTRACT

A valve stem with an adjustable tire pressure detector has a tire pressure detector, a valve stem body, a conducting member and a fastening assembly. The tire pressure detector has a guiding slot, a concave surface and a convex surface. The guiding slot is formed through the tire pressure detector and forms two openings. The concave surface and the convex surface are formed on the tire pressure detector respectively adjacent to the openings. The valve stem body is moveably mounted through the guiding slot and has a head being moveably mounted on the concave surface. The conducting member is mounted on the concave surface or the convex surface and is electrically contacted to the valve stem body and the tire pressure detector. The fastening assembly mounts the valve stem body on a rim securely.

10 Claims, 7 Drawing Sheets

VALVE STEM WITH AN ADJUSTABLE TIRE PRESSURE DETECTOR

BACKGROUND OF THE INVENTION

1. Field of Invention

The present invention relates to a valve stem with a tire pressure detector, and more particularly to a valve stem with an adjustable tire pressure detector.

2. Description of the Related Art

Car electronics, such as antilock brake system (ABS), electronic brake distribution (EBD), Electronic Power Steering (EPS), central control system, electric panel, electronic anti-slip control box, tire pressure detecting system (TPMS) or the like, have far improvement recently because people care about driving safety more and more nowadays. Wherein, the tire pressure monitoring system (TPMS) is applied for monitoring air pressure inside tires of a vehicle and aware a driver when abnormal air pressure occurs.

To improve adjustability of a tire pressure detector on a valve stem, the valve stem normally has a valve stem body, a fixing nut and a fastener, where the valve stem body has a domical end. When assembling, a serviceman has to remove a tire from a rim first, then the valve stem body is mounted securely on the rim with the fixing nut. Thereby, the tire pressure detector is capable of being mounted on the domical end of the valve stem body with the fastener after a position of the tire pressure detector on the domical end is adjusted.

However, too many components are needed for the conventional valve stem, this not only takes a lots of time to install the tire pressure detector and the valve stem on the rim, but also increases costs of maintenance of the tire pressure detector.

The present invention provides a valve stem with adjustable tire pressure detector to obviate or mitigate the shortcoming of the conventional valve stem with the tire pressure detector.

SUMMARY OF THE INVENTION

The primary objective of the present invention is to provide a valve stem with an adjustable tire pressure detector, where an adjustable tire pressure detector is mounted on a rim by a valve stem body directly to simplify the structure of the valve stem.

The valve stem has a tire pressure detector, a valve stem body, a conducting member and a fastening assembly. The tire pressure detector has a guiding slot, a concave surface and a convex surface. The guiding slot is formed through the tire pressure detector and forms two openings. The concave surface and the convex surface are formed on the tire pressure detector respectively adjacent to the openings. The valve stem body is moveably mounted through the guiding slot and has a head being moveably mounted on the concave surface. The conducting member is mounted on the concave surface or the convex surface and is electrically contacted to the valve stem body and the tire pressure detector. The fastening assembly mounts the valve stem body on a rim securely.

Other objectives, advantages and novel features of the invention will become more apparent from the following detailed description when taken in conjunction with the accompanying drawings.

DETAILED DESCRIPTION OF THE INVENTION

With reference to FIGS. 1, 2, 3 and 4, a valve stem with an adjustable tire pressure detector in accordance with the present invention has a tire pressure detector (20), a valve stem body (10), a conducting member (30, 30A) and a fastening assembly (40).

The tire pressure detector (20) has an electric module (28), a surface and a guiding slot (22), a concave surface (24) and a convex surface (26).

The electric module (28) is mounted inside the tire pressure detector (20), detects parameters inside a tire and continuously generates and transmits signals wirelessly corresponding to the detected parameters inside the tire. The parameters comprises a tire pressure, tire interior temperature, a tire rotation speed and the like.

The guiding slot (22) is formed through the tire pressure detector (20) and forms two openings on the surface of the tire pressure detector (20).

The concave surface (24) is formed on the surface adjacent to one of the openings of the guiding slot (22) and has two limiting walls (242).

The limiting walls (242) are connected to the concave surface (24) respectively, face to each other and may be parallel to each other.

The convex surface (26) is formed on the surface adjacent to the other one of the openings of the guiding slot (22).

The valve stem body (10) is movably mounted through the guiding slot (22), is conductive, may be an antenna for the tire pressure detector (20) and has an outer section (12) and an inner section (14).

The outer section (12) has an outer surface and a thread being formed on the outer surface of the outer section (12).

The inner section (14) is integrally and coaxially formed on the outer section (12), is movably mounted in the guiding slot (22) and has a distal end and a head (142). The head (142) is formed on the distal end of the outer section (12) and has an outer surface, a round surface (1422) and multiple pair of clamp surfaces (1424).

The round surface (1422) is formed on the head (142) between the outer surface of the head (142) and the distal end of the inner section (14) and corresponds to and is movably mounted detachably on the concave surface (24) when the valve stem body (10) is mounted through the guiding slot (22).

The clamp surfaces (1424) of each pair of clamp surfaces (1424) are symmetrically formed on the outer surface of the head (142) and are limited between and abut respectively with the two limiting walls (242) when the head (142) is mounted on the concave surface (24).

Figure 5:
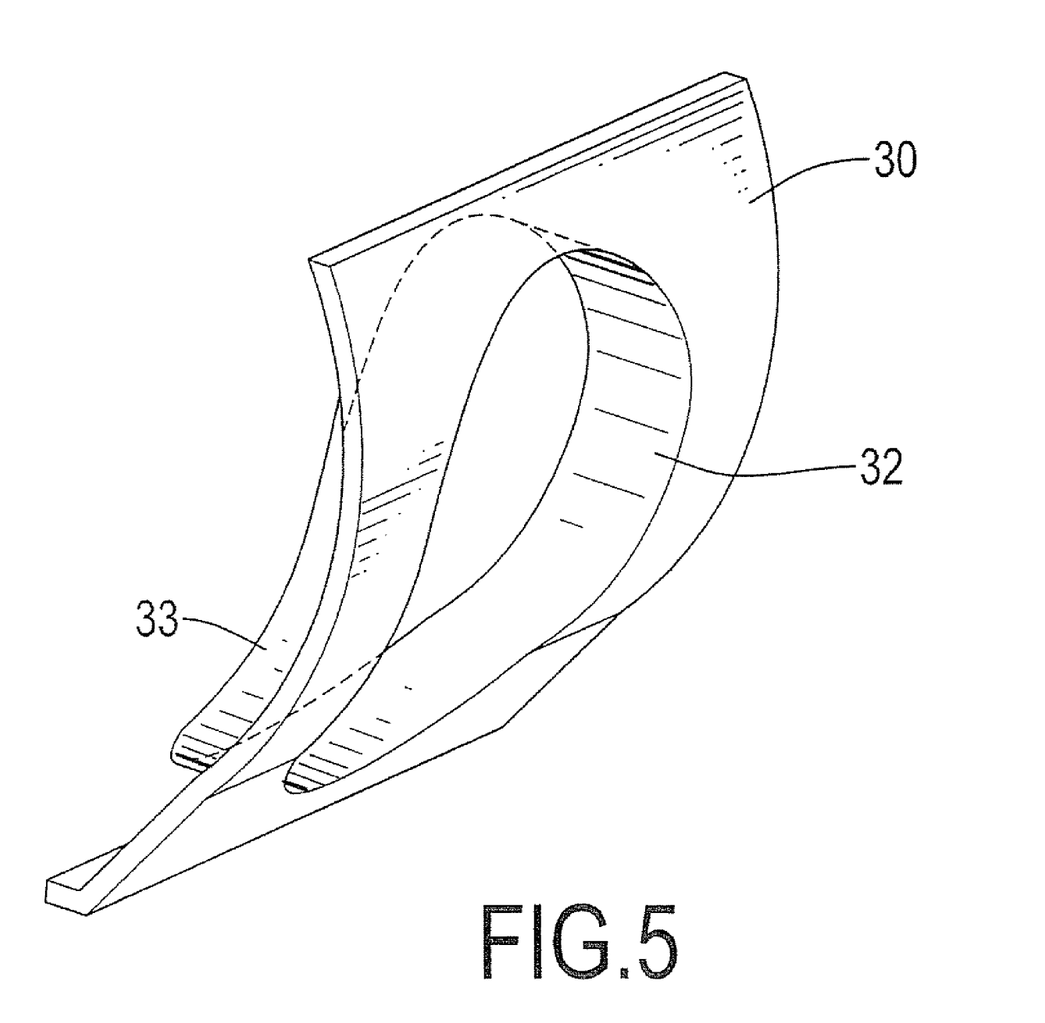
FIG. 5 is a perspective view of a conducting member of the valve stem with an adjustable tire pressure detector in accordance with the present invention.
Figure 6:
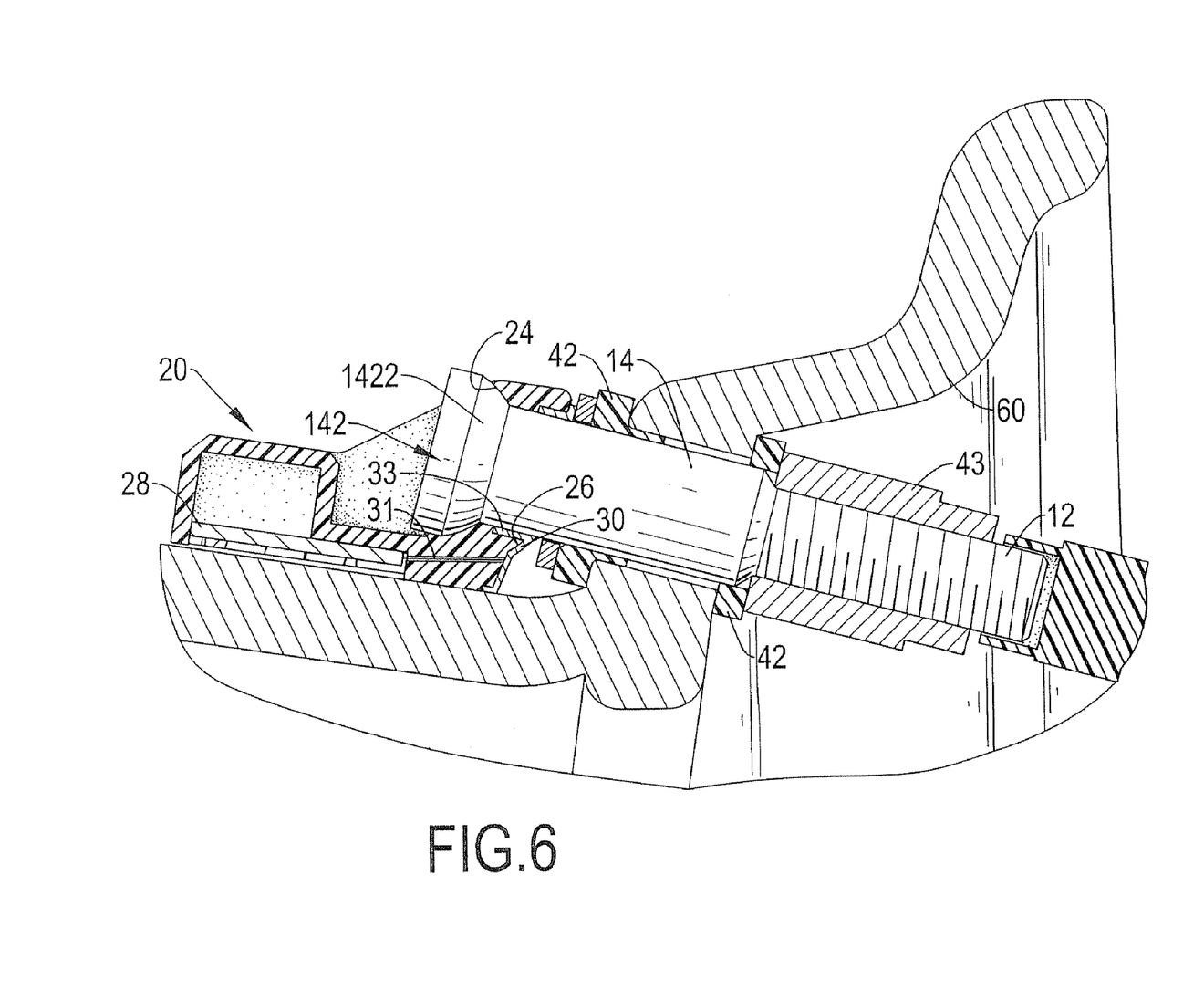
FIG. 6 a side view in partial section of the valve stem with an adjustable tire pressure detector mounted on the rim with the conducting member shown in FIG. 5.

With reference FIGS. 5 and 6, the conducting member (30, 30A) is electric conductible, is electrically connected with the electric module (28), is mounted on the surface of the tire pressure detector (20) adjacent to one of the openings of the guiding slot (22), may corresponds to and is mounted on the concave surface (24) or the convex surface (26), has a member slot (32) and may have an assistant flange (33). The member slot (32) is formed through the conducting member (30) and is shaped as and disposed corresponding to the guiding slot (22). The assistant flange (33) is conductible and protrudes from the conducting member (30, 30A) adjacent to the member slot (32).

In a preferred embodiment of the present invention, the conducting member (30) corresponds to and is mounted on the convex surface (26). The assistant flange (33) protrudes from the conducting member (30) into the guiding slot (22) when the conducting member (30) is mounted on the convex surface (26). Hence, the valve stem body (10) is well electronically connected with the tire pressure detector (20) to serve as an antenna. With the arrangement of the assistant flange (33), a contact area between the valve stem body (10) and the guiding slot (22) and the member slot (32) is increased.

Figure 7:
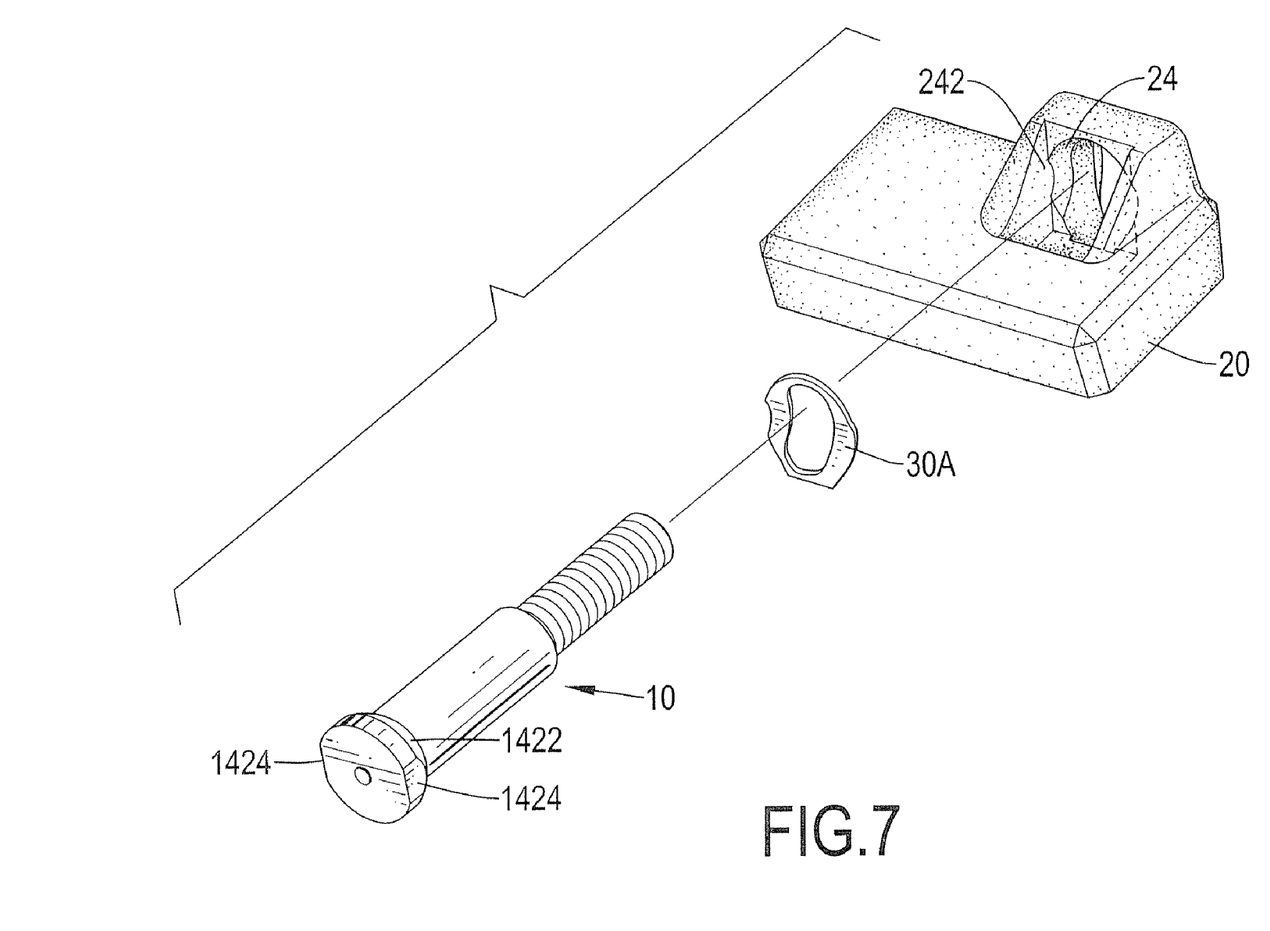
FIG. 7 is an exploded perspective view of the valve stem with an adjustable tire pressure detector in accordance with the present invention having a conducting member corresponding to a concave surface of the tire pressure detector.

With reference to FIG. 7, in a second embodiment of the present invention, the conducting member (30A) corresponds to and is mounted on the concave surface (24) and electrically contacts with the round surface (1422) of the head (142) when the valve stem body (10) is mounted through the member slot (32) and the guiding slot (22).

Figure 1:
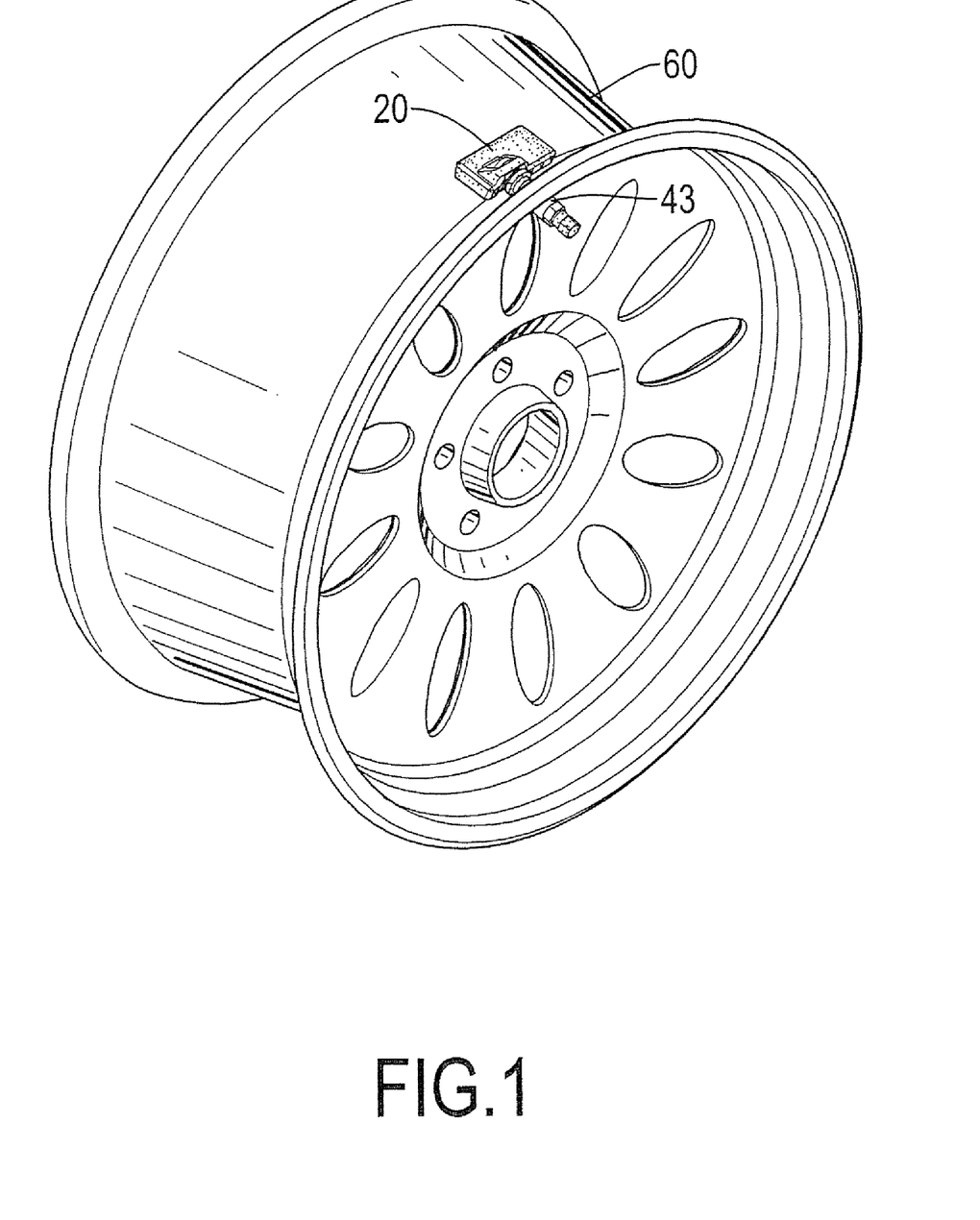
FIG. 1 is a perspective view of a valve stem with an adjustable tire pressure detector in accordance with the present invention, being mounted on a rim.
Figure 2:
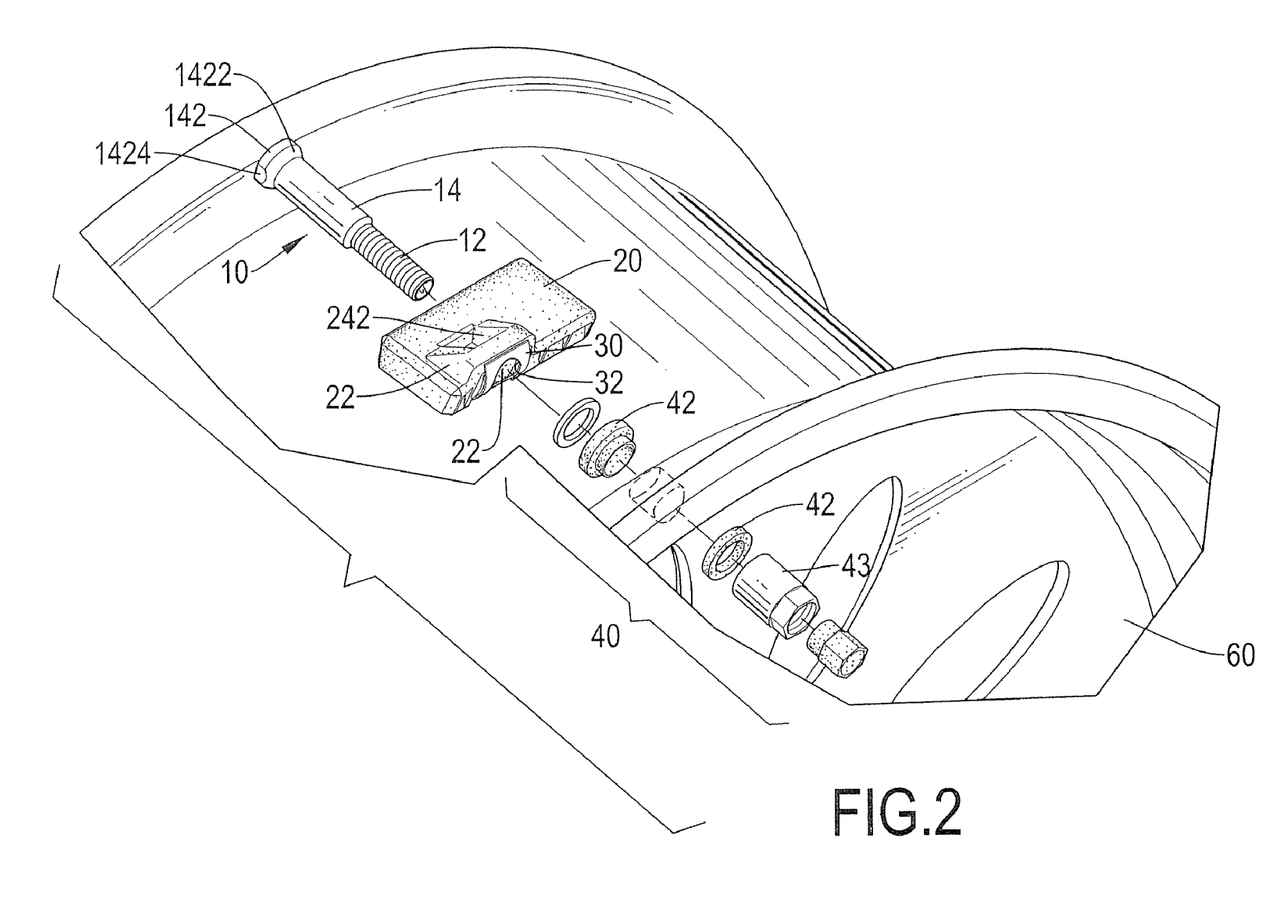
FIG. 2 is an exploded perspective view of the valve stem with an adjustable tire pressure detector in FIG. 1.
Figure 3:
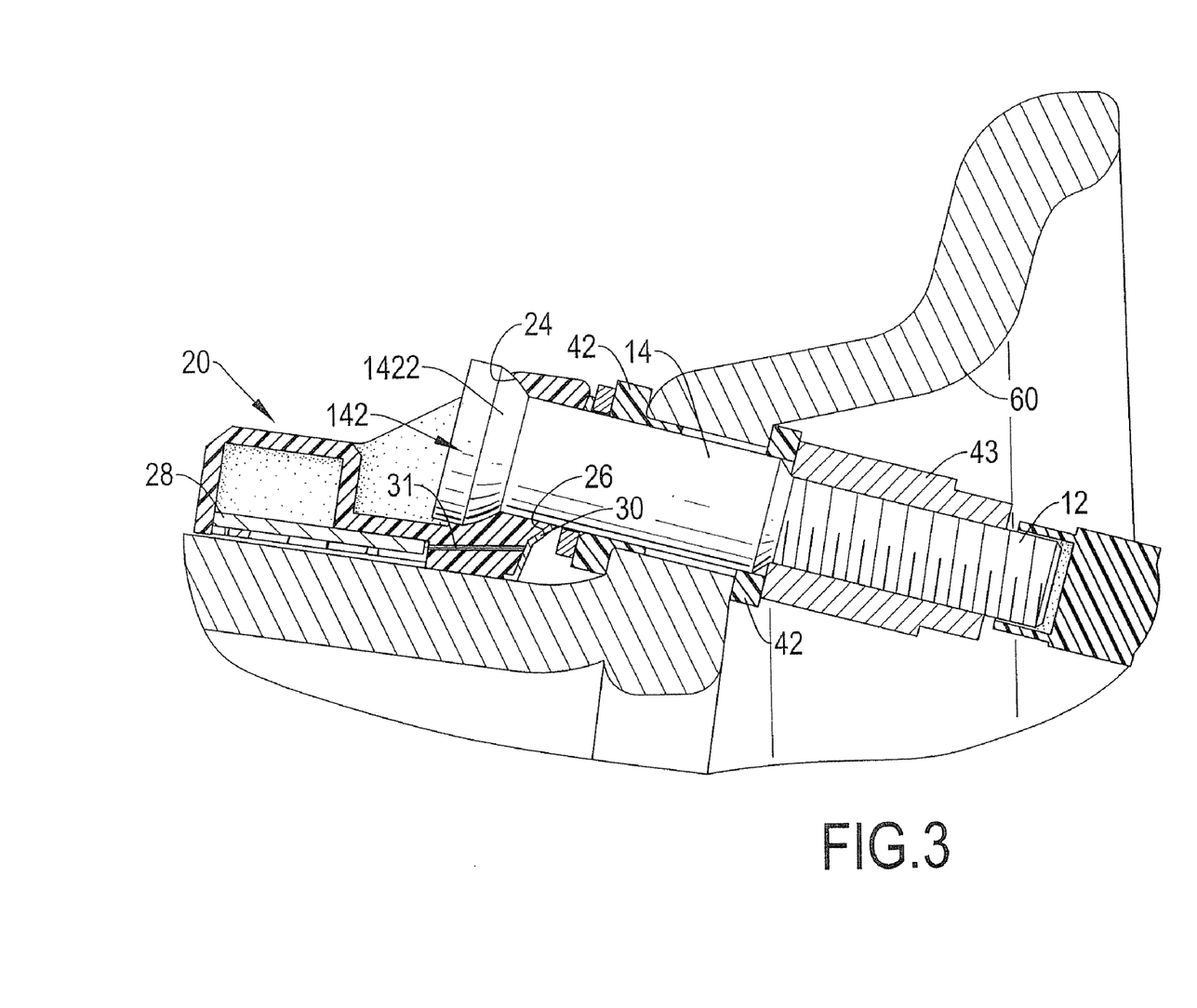
FIG. 3 is a side view in partial section of the valve stem in FIG. 1.
Figure 4:
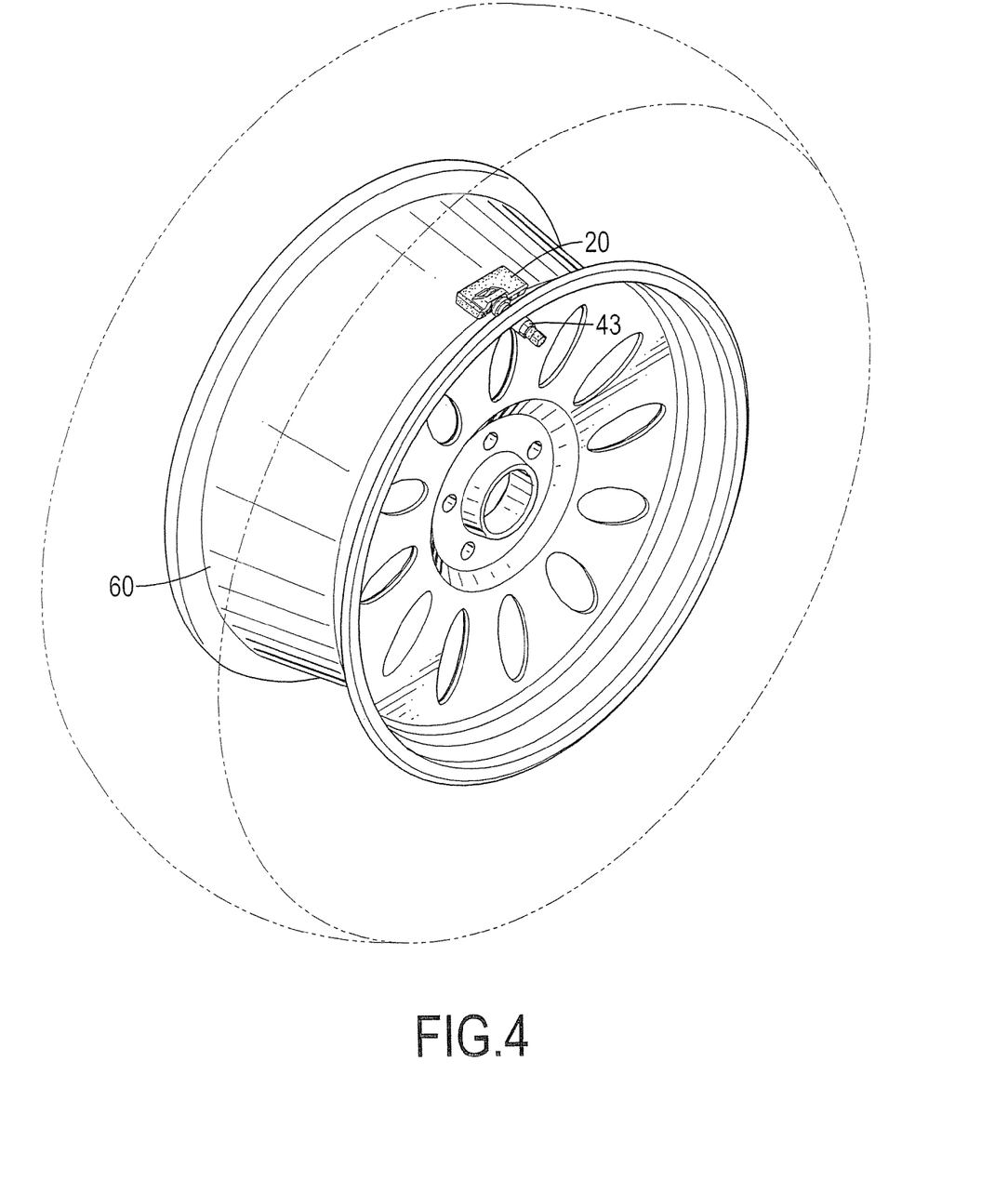
FIG. 4 is a perspective view of the valve stem in FIG. 1, being mounted on a rim mounted with a tire.

The fastening assembly (40) has a sealer (42) and a nut (43). The sealer (42) is mounted around the outer section (12) after the valve stem body (10) being mounted through a rim (60). The nut (43) is screwed with the thread of the outer section (12) to securely mount the valve stem body (10) and the sealer (42) on the rim (60). Hence, the tire pressure detector (20) is easily mounted securely inside a tire with the valve stem body (10) and the fastening assembly (40). Furthermore, a position of the tire pressure detector (20) is adjustable before the nut (43) securely mounts the valve stem body (10) on the rim (60). Additionally, no extra tool is needed but a spanner that is used to rotate the nut (43) on the valve stem body (10) since the valve stem body (10) is limited between the limiting walls (242) from rotation. A serviceman only needs to hold the tire pressure detector (20) and uses the spanner to mount the nut (43) on the valve stem body (10).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A valve stem comprising
   a tire pressure detector having
      an electric module being mounted inside the tire pressure detector;
      a surface; and
      a guiding slot being formed through the tire pressure detector and forming two openings on the surface of the tire pressure detector;
      a concave surface being formed on the surface of the tire pressure detector adjacent to one of the openings; and
      a convex surface being formed on the surface of the tire pressure detector adjacent to the other one of the openings;
   a valve stem body being movably mounted through the guiding slot, being conductive and having
      an outer section having an outer surface and a thread being formed on the outer surface of the outer section; and
      an inner section being integrally and coaxially formed on the outer section and having a distal end and a head being formed on the distal end of the outer section;
   a conducting member being electric conductible, being electrically connected with the electric module, being mounted on the surface of the tire pressure detector adjacent to one of the openings of the guiding slot and having
      a member slot being formed through the conducting member and being shaped as and disposed corresponding to the guiding slot; and
   a fastening assembly having
      a sealer being mounted on the outer section of the valve stem body; and
      a nut being rotatably mounted on the thread of the outer section of the valve stem body.

2. The valve stem as claimed in claim 1, wherein
   the head has an outer surface and a round surface, wherein the round surface is formed on the head between the outer surface of the head and the distal end of the inner section and corresponds to and is movably mounted detachably on the concave surface after the valve stem body being mounted through the guiding slot;
   the conducting member corresponds to and is mounted on the convex surface and electrically contacts with the valve stem body after the valve stem body being mounted through the member slot; and
   the valve stem body is an antenna of the electric module of the tire pressure detector.

3. The valve stem as claimed in claim 1, wherein
   the head has an outer surface and a round surface, wherein the round surface is formed on the head between the outer surface of the head and the distal end of the inner section and corresponds to and is movably mounted detachably on the concave surface after the valve stem body being mounted through the guiding slot;
   the conducting member corresponds to and is mounted on the concave surface and electrically contacts with the head of the valve stem body; and
   the valve stem body is an antenna of the electric module of the tire pressure detector.

4. The valve stem as claimed in claim 2, wherein the conducting member further has an assistant flange being conductible, protruding from the conducting member adjacent to the member slot and electrically contacting with the valve stem body after the valve stem body is mounted through the member slot.

5. The valve stem as claimed in claim 3, wherein the conducting member further has an assistant flange being conductible, protruding from the conducting member adjacent to the member slot and being electrically contacting with the valve stem body after the valve stem body is mounted through the member slot.

6. The valve stem as claimed in claim 1, wherein
   the concave surface has two limiting walls being connected to the concave surface respectively and facing to each other; and
   the inner section has multiple pair of clamp surfaces, the pairs of clamp surfaces are symmetrically formed on the outer surface of the head and one pair of the clamp surfaces is limited between and abuts respectively with the two limiting walls when the head is mounted on the concave surface.

7. The valve stem as claimed in claim 2, wherein the concave surface has two limiting walls being connected to the concave surface respectively and facing to each other; and the inner section has multiple pair of clamp surfaces, the pairs of clamp surfaces are symmetrically formed on the outer surface of the head and one pair of the clamp surfaces is limited between and abuts respectively with the two limiting walls when the head is mounted on the concave surface.

8. The valve stem as claimed in claim 3, wherein the concave surface has two limiting walls being connected to the concave surface respectively and facing to each other; and the inner section has multiple pair of clamp surfaces, the pairs of clamp surfaces are symmetrically formed on the outer surface of the head and one pair of the clamp surfaces is limited between and abuts respectively with the two limiting walls when the head is mounted on the concave surface.

9. The valve stem as claimed in claim 4, wherein the concave surface has two limiting walls being connected to the concave surface respectively and facing to each other; and the inner section has multiple pair of clamp surfaces, the pairs of clamp surfaces are symmetrically formed on the outer surface of the head and one pair of the clamp surfaces is limited between and abuts respectively with the two limiting walls when the head is mounted on the concave surface.

10. The valve stem as claimed in claim 5, wherein the concave surface has two limiting walls being connected to the concave surface respectively and facing to each other; and the inner section has multiple pair of clamp surfaces, the pairs of clamp surfaces are symmetrically formed on the outer surface of the head and one pair of the clamp surfaces is limited between and abuts respectively with the two limiting walls when the head is mounted on the concave surface.

* * * * *

UNITED STATES PATENT AND TRADEMARK OFFICE
CERTIFICATE OF CORRECTION

PATENT NO. : 7,757,550 B2  Page 1 of 1
APPLICATION NO. : 12/212304
DATED : July 20, 2010
INVENTOR(S) : Kuo-Chih Chuang et al.

It is certified that error appears in the above-identified patent and that said Letters Patent is hereby corrected as shown below:

On the Title Page the Assignee's name should read:

(73) Assignee: Orange Electronic Co., Ltd., Tanzih Hsiang (TW)

Signed and Sealed this

Twenty-first Day of December, 2010

David J. Kappos
*Director of the United States Patent and Trademark Office*